HYBRID COUNTER

FIG I

INVENTORS
JOHN J. ANDREA
NOEL E. HOGUE
JAMES C. MEIER
BY Moody and Phillion
ATTORNEYS

| NUMBER OF CLOCK PULSES | CONTENTS OF STAGES OF COUNTER 10 | | | CONDITION OF FLIP FLOP 19 | |
|---|---|---|---|---|---|
| | A | B | C | | |
| 0 | 0 | 0 | 0 | | |
| 1 | 1 | 0 | 0 | | |
| 2 | 0 | 1 | 0 | | |
| 3 | 1 | 1 | 0 | | |
| 4 | 0 | 0 | 1 | | |
| 5 | 1 | 0 | 1 | | |
| 6 | 0 | 1 | 1 | "1" ON LEAD 52 | TO ENERGIZE GATE 20 |
| 7 | 1 | 1 | 1 | "1" ON LEAD 53 | TO ENERGIZE GATE 32 |
| 8 | 0 | 0 | 0 | | |

INVENTORS
JOHN J. ANDREA
NOEL E. HOGUE
JAMES C. MEIER
BY Moody and Phillion
ATTORNEYS United States Patent Office 3,420,990

Patented Jan. 7, 1969

3,420,990
HYBRID COUNTER

John J. Andrea, Marion, Noel E. Hogue and James C. Meier, Cedar Rapids, Iowa, assignors to Collins Radio Company, Cedar Rapids, Iowa, a corporation of Iowa Filed Mar. 23, 1966, Ser. No. 536,797
U.S. Cl. 235—92 12 Claims
Int. Cl. G06j *1/00*

This invention relates generally to the high-speed counter and, more particularly, to a hybrid counter employing a high-speed input portion and a low-speed output stage portion, in order to obtain maximum speed of operation and high reliability with a relatively simple design.

In most high-speed counters only the input stages require high-speed capabilities. The later stages can have slower operating characteristics. Such generalizations are true of either binary counters or decimal counters.

High-speed counters in which all the stages are high speed are well known in the art. One such counter is a synchronous type counter in which the clock pulses are supplied to all stages simultaneously to cause shifting of the information in the proper manner. However, such synchronous counters are quite complex and require many elaborate and expensive AND gates; the number of AND gates increasing greatly as the number of counter stages increases. Further, considerable driving power is needed to operate the synchronous type counter since all stages are driven by the clock pulse and since so many AND gates are involved.

Low-speed counters by definition will not handle high-speed input signals. On the other hand, high-speed counters will usually handle low-speed inputs, although not always. A specific example of where there is needed a counter which will handle both high and low frequency input signals is the case of a variable ratio frequency divider. In such a device the output frequency is maintained at a constant value by comparing it with some constant reference frequency, and the frequency of the input signal is varied. Thus as the recycling count of the frequency divider is changed, the frequency of the input signal must be varied in order to maintain a constant output frequency. More specifically, assume that it is desired to produce a series of signals having frequency steps in equal increments of one kilocycle between the ranges of 1 megacycle and 1.2 megacycles. If the recycling count of the divider is 1200, then in order for the output frequency of the divider to be 1000 c.p.s., which is the frequency of the reference signal, then the frequency of the input signal from a variable controlled oscillator must be $1000 \times 1200$ or 1.2 megacycles. If the recycling count of the divider is reduced from 1200 to 1199, then in order for the output frequency of the divider to remain at 1000, the frequency of the output signal of the variable controlled oscillator must be $1000 \times 1199$ or 1.199 megacycles.

By proper selection of an array of variable controlled oscillators covering successive and contiguous frequency ranges it is possible to provide a wide range of frequencies spaced apart by equal frequency gaps as, for example, 1 kilocycle. Such a system employs a variable frequency divider, or counter, which must accommodate a wide range of input frequencies, including high frequency inputs.

It is a principal object of the invention to provide an inexpensive and reliable variable high-speed counter.

A second object of the invention is to provide a high-speed, variable ratio counter using high-speed input stages and low-speed output stages.

A third purpose of the invention is a high-speed counter employing high-speed input stages and low-speed output stages, and wherein the time interval for changing a single count in the low-speed stages is somewhat smaller than the complete recycling time of the high-speed input stages of said counter.

A fourth purpose of the invention is a high-speed counter means having high-speed synchronous type input stages and low-speed chain counter output stages and in which the overall speed of the counter is limited only by the speed of the high-speed synchronous input stages.

The fifth purpose of the invention is the improvement of high-speed counters generally.

In accordance with the invention there is provided a high-speed counter comprised of two principal portions, the first portion being a high-speed synchronous type counter comprised of a plurality of stages and the second portion being a low-speed counter comprised of a plurality of stages. The low-speed portion of the counter is responsive to the output signal of the high-speed portion of the counter so that each time the high-speed counter recycles once, the low-speed counter adds one count.

A first plurality of recycling control AND gates individually are associated, one each, with each individual stage of said low-speed counter portion. Means are provided for selectively conditioning said recycling control AND gates so that when the low-speed counter contains a predetermined count an output signal is generated which functions to clear said low-speed counter and to set a binary "1" in the lowest significant digit of said low-speed counter.

The setting of the binary "1" in the lowest significant digit of the low-speed counter functions to provide an interval of time for the low-speed counter to reset to "0" after the count therein has reached the desired predetermined count. More specifically, the setting of the "1" in the low-speed counter requires that the high-speed counter completely recycle once after the low-speed counter has reached its predetermined count in order that the count set into the low-speed counter be correct.

Other means are provided to produce a system output pulse upon completion of the recycling of the high-speed counter after the low-speed counter has produced its output signal indicating that it has obtained its preset count.

In accordance with a feature of the invention, a second plurality of recycling control AND gates are provided, one each for each of the stages of the high-speed synchronous counter. With the aid of such second recycling control AND gates, and with other logic means the first output pulse of the synchronous counter can be made to occur after receiving more input pulses than the normal maximum recycling count of said synchronous counter. More specifically, by such logic means a maximum count $2N-1$ can be supplied to the synchronous counter before an output pulse is delivered to the slow counter, where N is equal to the maximum number of counts for recycling the synchronous counter during normal operation.

The above-mentioned, and other objects and features of the invention, will be more fully understood from the following detail description thereof when read in conjunction with the drawings in which.

Figure 1:
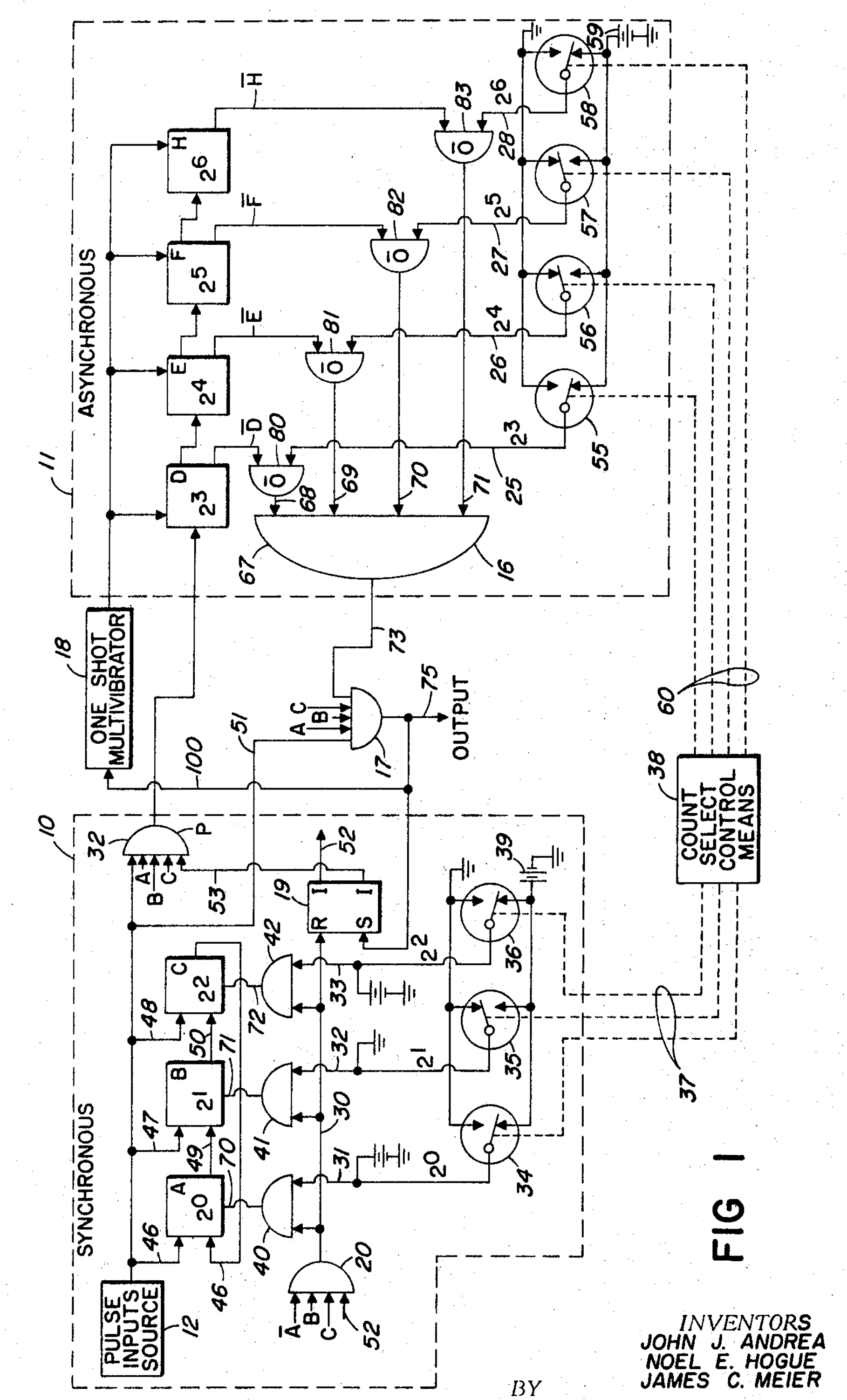
FIG. 1 shows a combination logic diagram and schematic diagram of the invention.

In FIG. 1 the clock pulses are supplied from pulse input source 12 to the high-speed synchronous portion 10 of the counter. The low-speed portion of the counter is shown within the dotted rectangle 11. AND gate 17 is a system output AND gate for the entire counting system.

The high-speed synchronous portion of counter 10 contains three stages, labeled A, B, and C, which represent the binary values $2^0$, $2^1$, and $2^2$, respectively. It will be noted that the clock pulses are supplied via common bus bar 45, to the three input leads 46, 47, and 48 of stages A, B, and C. Stage A is further connected to stage B through connecting means 49, stage B is connected to stage C through connecting means 50, and stage C is connected back to the first stage A through connecting means 46. The detailed structures of stages A, B, and C are not shown in detail since such structures are well known in the art. It is to be understood, however, that stages A, B, and C contain the proper logic circuit required in a synchronous counting means, including a flip-flop type circuit which has a set and a reset condition. By definition, when any of the stages A, B, or C, or any of the stages D, E, F, and H of the asynchronous counter 11 are in the reset condition they are defined as containing a binary "0." If they are in a set condition, they are defined as containing a binary "1." Similarly, when any of the AND gates discussed in the circuit are defined as being conductive, or open, a logic "1" will appear on the output terminal thereof.

Referring again to the synchronous counter 10, since there are three stages in said counter the normal recyling count thereof is 8. More specifically, the first count will produce the binary number 100 in the synchronous counter 10, the second count will produce the binary number 010, the third count the binary number 110, the fourth count the binary number 001, etc. The seventh count will produce a binary number 111 in the counter, and the eighth count will reset all three stages to 0.

On the eighth count the conditions for conductivity of the AND gate 32 are met and a pulse is passed into the asynchronous counter 11. More specifically, the AND gate 32 has five input leads thereto; the input lead 45 being connected to the output of the pulse input source 12, and input leads A, B, and C representing input leads upon which "1's" appear when each of the stages A, B, and C are in a set condition; and the input lead 53 being from the NOT I ($\bar{I}$) output terminal of flip-flop 19. In the normal operation of the device the NOT I output of flip-flop 19 has a "1" thereon, thus conditioning AND gate 32 to be conductive when "1's" appear on the other four leads thereof. Consequently, on the count of 7 the leads A, B, and C of AND gate 32 all acquire "1's" thereon. Assuming normal operation is in effect so that a "1" appears on input lead 53, the eighth count pulse on lead 45 is passed through AND gate 32 and into asynchronous counter 11.

In the normal operation of the circuit, thereafter on each eighth clock pulse a pulse will pass through AND gate 32 and into asynchronous 11, which is comprised of stages D, E, F, and H. The asynchronous counter 11 will continue to count input pulses supplied thereto until the accumulated count in the asynchronous counter 11 is equal to a particular preset count set into switches 55, 56, 57, and 58. The recycling control AND gates 80, 81, 82, and 83 respond to coincidence of the counts in asynchronous counter 11 and in the switches 55 through 58 to produce an output pulse from AND gate 67; which output pulse is supplied to the input lead 73 of AND gate 17. When the synchronous counter 10 once again contains a binary number 111 on the next recycling thereof, the leads A, B, and C of AND gate 17 will all contain "1's". Then, on the following clock pulse from pulse input source 12 the input lead 51 of AND gate 17 will contain a "1" and a binary "1" output will appear on the output terminal 75 of AND gate 17. Such output terminal 75 is the output terminal of the entire counting system.

From the foregoing brief discussion it would seem that the output pulses appearing on output terminal 75 of AND gate 17 would necessarily limit the division of the frequency of the pulse input source 12 to multiples of 8 since the synchronous counter 10 supplies a pulse to the asynchronous counter 11 only on every eighth input count thereto. However, such is not the case. The count recycling AND gates 40, 41, and 42, AND gate 20, flip-flop 19, AND gate 32, and switches 34, 35, and 36 all function together to provide for an initial count of up to 15 in the synchronous counter which is longer than the normal recycling count of 8, before a pulse is supplied through AND gate 32 to asynchronous counter 11. In other words, it might be desired to divide the input source frequency 12 by a number not an integral multiple of 8, such as, for example, the number 77. The binary number representing the decimal number 77 is 1011001 with the last four binary bits 1001 being preset into the switches 55, 56, 57, and 58, respectively, and the first three binary bits 101 being set into the switches 34, 35, and 36, respectively.

To obtain the number 77, the synchronous counter 10 must obviously be recycled a total of 9 times to enter a count of 9 in the asynchronous counter 11, and then further the synchronous counter 10 must count to 5 and such additional count of 5 must somehow be detected in the counter 10.

The additional count of 5 is effected generally in the following manner. On the first cycling of the synchronous counter 10 at the beginning of the count of 77, the counter 10 is caused to count to 6 so that the stages A, B, and C contain the binary number 011. By means of the cycling count control gates 40, 41, and 42, set AND gate 20, and the switches 34, 35, and 36, the synchronous counter 10 is, on the count of 7, reset back to the count of 2 so that the stages A, B, and C contain the binary number 010. On the next recycling, appropriate logic means, including specifically the flip-flop circuit 19, function in the operation of the circuit to permit the count to proceed past the count of 6 to the count of 7 so that the stages A, B, and C contain the binary number 111. Thus when the 13th clock pulse is received it will pass through AND gate 32 to asynchronous counter 11.

It is to be noted that flip-flop 19, at the beginning of the counting cycle, was in a reset condition so that a "1" appeared on the output lead 52 thereof. The lead 52 is connected to one of the inputs of the set gate 20 so that on the first count of 6 of counter 10 the gate 20 will pass a "1" through to the recycling count control gates 40, 41, and 42. However, such output of gate 20 will also function to reset flip-flop 19 to place a "1" on its output lead 53 and a "0" on output lead 52. Consequently, when the count of the synchronous counter 10 reaches 6 on the second time around, the gate 20 will not conduct a "1" to recycling gates 40, 41, and 42, and the count can continue past count 6 to count 7 and then back to "0" on the 13th input pulse.

On every eighth count thereof, specifically the 21st, the 29th, the 37th, the 45th, the 53rd, the 61st, and the 69th counts a "1" will be passed through AND gate 32 to the asynchronous counter 11. The 77 count, however, will not be passed through AND gate 32 for the following reasons.

At the beginning of the count a "1" had been preset into stage D of asynchronous counter 11. Thus when the 69th count passed through AND gate 32, the actual count registered in the asynchronous counter 11 was a binary 0001001 representing a decimal number 72. Such binary number 0001001 is equal to the binary number preset into control switches 55, 56, 57, and 58 so that coincidence will occur on all four of the count control gates 80, 81, 82, and 83 and "1's" will appear on the outputs of said control gates. The AND gate 67 is thereby caused to become conductive to pass a "1" to its output lead 73 which is connected to an input of the AND gate 17. However, at this time the input leads A, B, and C of AND gate 17 have "0's" thereon since the 69th count functioned to reset the stages A, B, and C of counter 10 to 0. Thus the synchronous counter 10 must receive an additional seven counts to cause the stages A, B, and C thereof to each contain a "1" and thus provide "1's" on the leads A, B, and C of AND gate 17. Then on the next pulse, which would be the 77th clock pulse, the input lead 51 of AND gate 17 has a "1" thereon so that all five leads of AND gate 17 have "1's" thereon, and the gate 17 will pass a "1" to the output terminal 75. Such a "1" appears on the output terminal 75 every 77th input pulse from pulse input source 12.

The output pulse on terminal 75 also functions to initiate reset conditions in the counters 10 and 11. More specifically, such output pulse is fed back through lead 100 to flip-flop 19 to put a "1" on the output lead 52 thereof, and also functions to energize one-shot multivibrator 18 which resets to 0 stages E, F, and H, and sets stage D to "1."

It will be specifically noted that by setting stage D to "1" the synchronous counter 10 must recycle once after the count of the synchronous counter 11 reaches the count preset into control switches 55, 56, 57, and 58. Such a final recycling of the synchronous counter 10 permits the relatively slow asynchronous counter 11 to reset to "0" (except for the first stage D which is set to 1) in preparation for the next cycle.

The control switches 34, 35, and 36 associated with counter 10, and the control switches 55, 56, 57, and 58 associated with counter 11 can be set by any suitable means designated generally as count select control means 38. Such count select control means can be simply a series of seven toggle switches, one toggle switch associated with each of the switches 34 through 36 and 55 through 58. Coupling means 37 and 60 represent mechanical couplings between the toggle control means and the actual switches 34 through 36 and 55 through 58. Each of the switches 34 through 36 and 55 through 58 have one of two positions, the upper position being connected to ground and the lower position being connected to a positive battery, such as battery 39 or battery 59. When the armatures of any of these switches are connected in the lower position to the positive battery, a logic "1" is impressed upon the input lead of the associated recycling count control gates 40–42 and 80–83. On the other hand, when the armatures of any of the switches 34 through 36 or 55 through 58 are in their upper position and connected to ground potential, a logic "0" is supplied to the associated recirculating count control gate.

If a "1" is supplied to the input of any of the recirculating count control gates 40–42 from one of the control switches 34–36, a logic "1" will be supplied to the associated stage of the counter when a logic "1" appears on the output of the set AND gate 20. Such a "1" on the output of the control gates 40, 41, or 42 will function to reset the associated stage of stages A, B, or C to "0." In other words, the specific binary number appearing on the outputs of AND gates 40 41, and 42, when gate 20 is energized, will produce the complement of such binary number in the stages A, B, and C of synchronous counter 10.

It is to be noted that there is no corresponding resetting of the asynchronous counter 11 to a partial count by the control gates 80–83. While the recycling count of counter 11 is determined by the control gates 80–83 and the setting of switches 55–58, such count is always the same for each recycling thereof.

Figures 2, 3:
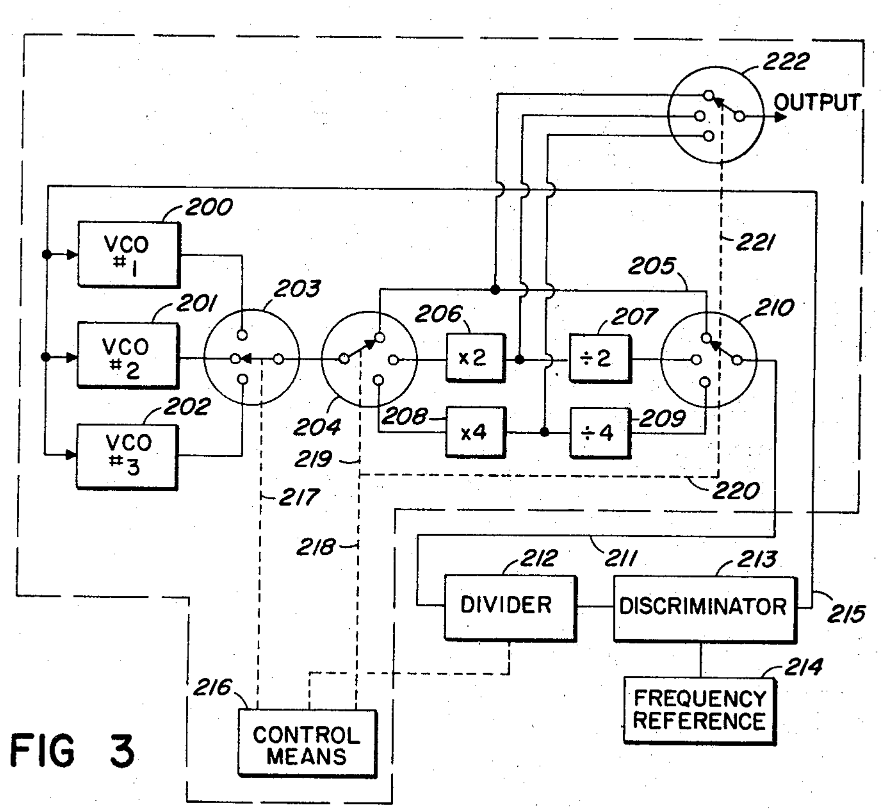
FIG. 2 is a truth table showing logic of the fast synchronous counter.
FIG. 3 is a block diagram illustrating how the counter is employed in a frequency divider system.

Referring to FIG. 2, there is shown a truth table of the operation of the synchronous counter 10. In the left-hand column is shown the number of clock pulses required to recycle the three stages A, B, and C of synchronous counter 10. The three columns to the right of the clock pulse column show the conditions of the three stages of the counter 10. The column at the extreme right shows the condition of flip-flop 19 required to produce an output on gate 20 at count 6 of the counter and to produce an output from gate 32 when counter 10 contains a 7.

Referring now to FIG. 3, there is shown an overall system in which the divider of FIG. 1 is used. In FIG. 3 the divider 212 corresponds to the complete circuit of FIG. 1. The discriminator 213 functions to receive the output of the divider, which must be a constant frequency, and the output of the frequency reference 214, to produce an output D-C voltage on output lead 215 with a polarity and magnitude indicating the difference in frequencies from divider 212 and reference 214. Such D-C voltage is supplied back to a variable controlled oscillator, such as VCO 200, 201, or 202, whichever one of these three might be selected, to control and adjust the frequency thereof.

The range of any given VCO is approximately from 1 to 1.26, or 26%. Thus to cover a bandwidth of a factor of 10, such as from 20 megacycles to 200 megacycles, approximately six VCO's would be required. Only three are shown in the circuit of FIG. 3. It is to be understood that more can be used.

Another means of expanding the frequency range of the device is to multiply the outputs of the VCO, such as VCO 200 for example, by 2 and then divide by 2, such as would be performed in the arithmetic circuits 206 and 207. The output from the multiplier 206 will, of course, be twice the frequency of the VCO 200. However, the output of the divider 207 will be the same as the output of the VCO 200 and can be accommodated by the divider 212. More specifically, the frequency presented to the divider 212 is the same as if it were connected directly to the VCO 200. However, the output which is taken from the output terminal of multiplier 206 is twice the frequency that would be obtained by connecting the VCO 200 directly to the divider 212. It is to be noted, however, that in multiplying by 2 the frequency increments are twice that which can be obtained by connecting the VCO directly to the divider 212. In a similar manner the output of the VCO 200 can be multiplied by 4, as indicated by the circuit 208, to produce output signals having four times that to be obtained by connecting VCO 200 directly to the divider 212. The output of the multiplier 208 is divided by 4 in the circuit 209 to provide a signal having the proper frequency to the divider 212.

Thus the three VCO's 200–202 can cover a frequency range of the factor 2 as, for example, from 50 to 100 megacycles with 1 kc. increments. However, multiplying the outputs of the VCO 200, 201, or 202 by a factor of 2, the range is increased from 100 megacycles to 200 megacycles, but with 2 kc. increments. Multiplying the output of the VCO's by 4 increases the range from 200 megacycles to 400 megacycles, but with increments of 4 kc.

The switches 210, 204, and 222 are all connected together and operated from the control means 216. The switch 203 is operated separately and used to select one of the three VCO's 200, 201, or 202.

It is to be understood that the form of the invention shown and described herein is but a preferred embodiment thereof and that various changes may be made in the circuit thereof without departing from the spirit or scope of the invention. For example, the same principle can easily be applied to binary coded decimal counters or decimal counters.

We claim:

1. A hybrid counter constructed to recycle every Mth count and comprising:
  - a first recycling counting means comprise of a plurality of high-speed counting stages;
  - a second recycling counting means comprised of a plurality of low-speed counting stages;
  - connecting means for supplying the Nth count position of said first counting means to the input of said second counting means;
  - means responsive to a predetermined count P of said second counting means and a predetermined count of said first counting means to produce an output pulse;
  - first resetting means responsive to said output pulse to reset the stages of said second counting means to a predetermined count position R;

said predetermined count of said first counting means being selected to occur after said predetermined count P by an interval of time greater than that required for said second counting means to be reset to count position R.

2. A hybrid counter in accordance with claim 1 in which said connecting means comprises first gating means constructed, when opened, to supply the output of said first counting means to said second counting means, and further comprising:

second resetting means constructed, when energized, to reset said first counting means to a selectable count position;

second gating means constructed, when opened, to supply an energizing signal to said second resetting means;

and switching means responsive to said output pulse to condition said second gating means to be opened when said first counting means contains a predetermined count;

said switching means further responsive to an output from said second gating means to condition said first gating means to pass the Nth count pulses of said first counting means to said second counting means.

3. A hybrid counter in accordance with claim 1 in which said connecting means comprises first gating means constructed, when opened, to supply the output of said first counting means to said second counting means, and further comprising:

second resetting means constructed, when energized, to reset said first counter to a preselectable count; and switching means responsive to said output pulse to assume a first state to condition said second resetting means to reset said first counting means to said preselectable count when the count of said first counting means reaches a predetermined value.

4. A hybrid counter in accordance with claim 3 in which said first gating means is responsive to said first state of said switching means to prevent the supplying of any output pulses from said first counting means to said second counting means.

5. A hybrid counter in accordance with claim 4 in which said switching means is responsive to the opening of said second gating means to assume a second state to open said first gating means to supply the output from the said first counting means to said second counting means.

6. A hybrid counter means in accordance with claim 5 in which said second resetting means is constructed to be inhibited by the second state of said switching means to prevent resetting of said first counting means by said second resetting means.

7. A hybrid counter constructed to recycle every Mth count and comprising:

a first recycling binary counting means comprised of a plurality of high-speed counting stages and constructed to count in response to input pulses;

a second recycling binary counting means comprised of a plurality of low-speed counting stages;

connecting means for supplying the Nth count position of said first counting means to the input of said second counting means;

means responsive to a predetermined count P of said second counting means and a predetermined count of said first counting means to produce and output pulse;

first resetting means responsive to said output pulse to set the least significant stage of said second counting means to a binary "one" and to reset the remaining stages of said second counting means to a binary "zero."

8. A hybrid counter in accordance with claim 7 in which said connecting means comprises first gating means constructed, when opened, to supply the output of said first counting means to said second counting means, and further comprising:

second resetting means constructed, when energized, to reset said first counting means to a selectable count position;

second gating means constructed, when opened, to supply an energizing signal to said second resetting means;

and switching means responsive to said output pulse to condition said second gating means to be opened when said first counting means contains a predetermined count;

said switching means further responsive to an output from said second gating means to condition said first gating means to pass the Nth count pulses of said first counting means to said second counting means.

9. A hybrid counter in accordance with claim 7 in which said connecting means comprises first gating means constructed, when opened, to supply the output of said first counting means to said second counting means, and further comprising:

second resetting means constructed, when energized, to reset said first counter to a preselectable count; and switching means responsive to said output pulse to assume a first state to condition said second resetting means to reset said first counting means to said preselectable count when the count of said first counting means reaches a predetermined value.

10. A hybrid counter in accordance with claim 9 in which said first gating means is responsive to the first state of said switching means to prevent the supplying of any output pulses from said first counting means to said second counting means.

11. A hybrid counter in accordance with claim 10 in which said switching means is responsive to the opening of said second gating means to assume a second state to open said first gating means to supply the output of the said first counting means to said second counting means.

12. A hybrid counter means in accordance with claim 11 in which said second resetting means is constructed to be inhibited by the second state of said switching means to prevent resetting of said first counting means by said second resetting means.

References Cited by the Applicant

UNITED STATES PATENTS

| | | | |
|---|---|---|---|
| 2,997,234 | 8/1961 | Hughes | 235—92 |
| 3,056,548 | 10/1962 | Nichols | 235—92 |
| 3,177,474 | 4/1965 | Wagner | 235—92 |
| 3,258,583 | 6/1966 | Davies | 235—92 |

MAYNARD R. WILBUR, *Primary Examiner.*

GREGORY J. MAIER, *Assistant Examiner.*

U.S. Cl. X.R.

307—220; 328—38